US009579660B2

(12) United States Patent
Lehtinen

(10) Patent No.: US 9,579,660 B2
(45) Date of Patent: Feb. 28, 2017

(54) PROCESS FOR WET HIGH INTENSITY MAGNETIC SEPARATION WITH FLUX AMPLIFYING MATRIX

(71) Applicant: MagGlobal, LLC, Grand Rapids, MN (US)

(72) Inventor: Larry J. Lehtinen, Gilbert, MN (US)

(73) Assignee: MagGlobal, LLC, Grant Rapids, MN (US)

( * ) Notice: Subject to any disclaimer, the term of this patent is extended or adjusted under 35 U.S.C. 154(b) by 464 days.

(21) Appl. No.: 13/922,971

(22) Filed: Jun. 20, 2013

(65) Prior Publication Data

US 2013/0341250 A1 Dec. 26, 2013

Related U.S. Application Data

(60) Provisional application No. 61/662,033, filed on Jun. 20, 2012.

(51) Int. Cl.
*B03C 1/00* (2006.01)
*C22B 3/22* (2006.01)
(Continued)

(52) U.S. Cl.
CPC ................ *B03C 1/00* (2013.01); *B03C 1/032* (2013.01); *B03C 1/30* (2013.01); *C22B 3/22* (2013.01); *B03C 2201/18* (2013.01)

(58) Field of Classification Search
CPC ......... C04B 14/308; B03C 1/00; B03C 1/002; B03C 1/005; B03C 1/015; B03C 1/025;
(Continued)

(56) References Cited

U.S. PATENT DOCUMENTS 3,295,924 A * 1/1967 Colombo ................ C01F 7/066 209/8
3,375,925 A 4/1968 Carpenter
(Continued)

OTHER PUBLICATIONS

International Search Report and Written Opinion, ISA/US, PCT/US2013/046823, Magnetation, Inc., Nov. 2, 2013.
(Continued)

*Primary Examiner* — David C Mellon
(74) *Attorney, Agent, or Firm* — Taft Stettinius & Hollister LLP

(57) ABSTRACT

A method, process or system for producing an iron oxide concentrate from a treatment slurry of a low grade mineral assemblage includes mixing a flocculant with the treatment slurry and dewatering the treatment slurry before passing the treatment slurry through a wet high intensity magnetic separator of a type that employs a flux amplifying matrix (i.e., a WHIMS-FAM device) and recovering an iron oxide concentrate fraction and a tailings fraction from the WHIMS-FAM device. Another method, process or system for producing an iron oxide concentrate includes passing the treatment slurry through a WHIMS-FAM device and recovering an iron oxide concentrate fraction slurry and a tailings fraction slurry from the WHIMS-FAM device; mixing a flocculant with the concentrate fraction slurry and dewatering the concentrate slurry to provide a thickened concentrate slurry before filtering the thickened concentrate slurry to provide a concentrate filter cake.

29 Claims, 1 Drawing Sheet

Process Flow and Projected Mass Balance

(51) Int. Cl.
*B03C 1/032* (2006.01)
*B03C 1/30* (2006.01)

(58) Field of Classification Search
CPC ....... B03C 1/032; B03C 1/30; B03C 2201/18; B03C 2201/20; B01J 20/0229; B01J 20/06; C01G 49/009; C01G 49/0018; C01G 49/02; C01G 49/04; C01G 49/06; C01G 49/08; C22B 3/00; C22B 3/0098; C22B 3/20; C22B 3/205; C22B 3/22; C22B 3/24; C22B 3/42; C22B 3/44; C22B 3/46; C02F 11/12; C02F 11/14; C02F 1/52; C02F 1/5272; C02F 1/54; C02F 1/56; C02F 1/64
See application file for complete search history.

(56) References Cited

U.S. PATENT DOCUMENTS

| | | | | |
|---|---|---|---|---|
| 4,166,788 | A | 9/1979 | Druz et al. | |
| 4,192,738 | A * | 3/1980 | Colombo | B03C 1/03 209/166 |
| 4,611,951 | A | 9/1986 | Sapp | |
| 4,741,838 | A * | 5/1988 | Sharpe, Jr. | C02F 1/54 106/487 |
| 4,940,550 | A * | 7/1990 | Watson | B01D 35/06 210/223 |
| 6,274,045 | B1 | 8/2001 | Kreisler | |
| 6,555,010 | B2 | 4/2003 | Barrett | |
| 6,968,956 | B2 | 11/2005 | Iwasaki | |
| 7,820,053 | B2 | 10/2010 | Cort | |
| 7,886,913 | B1 * | 2/2011 | Fritz | B03C 1/247 209/214 |
| 8,137,566 | B2 | 3/2012 | Bozak et al. | |
| 8,292,084 | B2 | 10/2012 | Chappie et al. | |
| 2006/0287404 | A1 | 12/2006 | Horiishi et al. | |
| 2010/0000924 | A1 | 1/2010 | Hayashi et al. | |
| 2010/0170856 | A1 | 7/2010 | Branning | |
| 2011/0078917 | A1 | 4/2011 | Bland et al. | |
| 2012/0325726 | A1 | 12/2012 | Lehtinen et al. | |

OTHER PUBLICATIONS

Weber, Phyllis K., The Use of Chemical Flocculants for Water Clarification: A Review of the Literature With Application to Placer Mining, Alaska Department of Fish and Game, Habitat Division,Technical Report No. 86-4, Apr. 1986.

* cited by examiner

Process Flow and Projected Mass Balance
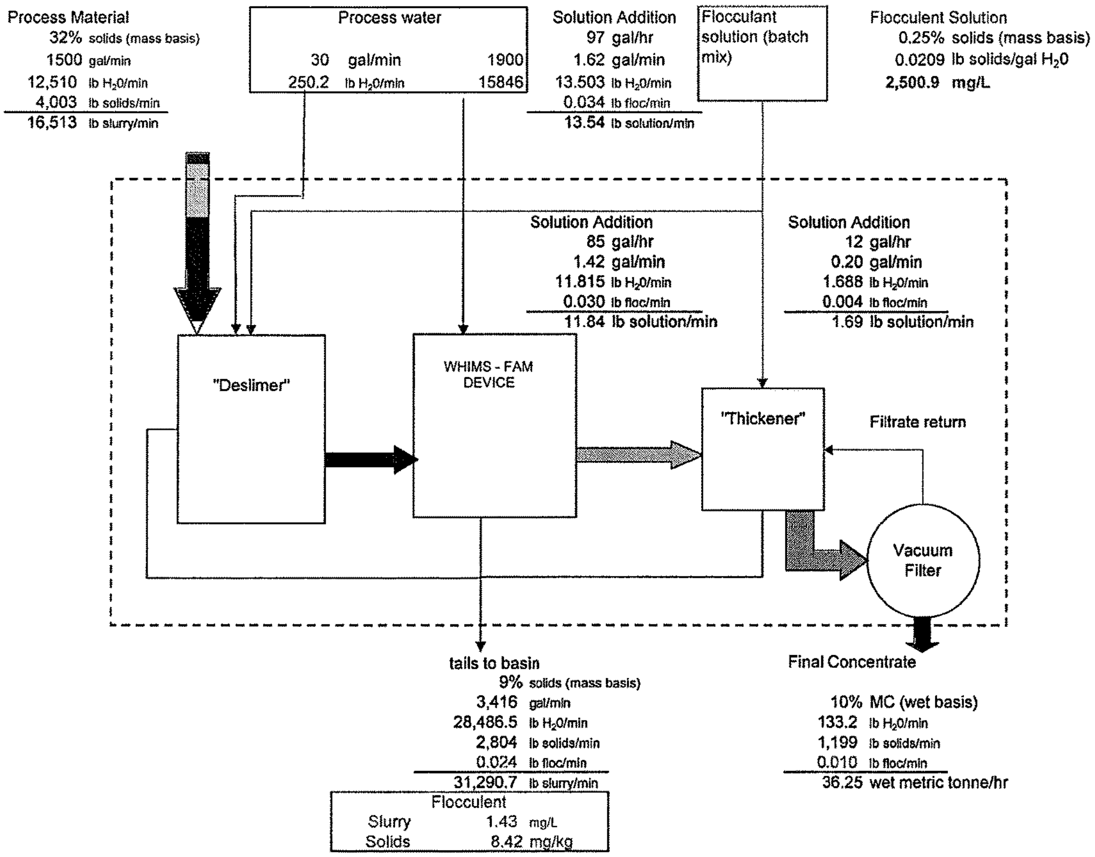

PROCESS FOR WET HIGH INTENSITY MAGNETIC SEPARATION WITH FLUX AMPLIFYING MATRIX

CROSS-REFERENCE TO RELATED APPLICATIONS

The present application claims the benefit of U.S. Provisional Patent Application No. 61/662,033 filed on Jun. 20, 2012, the content of which is hereby incorporated by reference in its entirety.

BACKGROUND

Due to the high demand for iron oxides that has existed over many decades, sources of high grade ore have become depleted or, in some areas, exhausted. As a result, a great deal of attention has been given to the development of technology to recover iron oxides from low grade iron ore materials. As used herein, the term "low grade iron ore" refers to a material that is composed of a mixture of one or more iron oxide and substantial amounts of one or more non-iron impurity, commonly one or more of quartz, chert, carbonate or the like. One example of a low grade iron ore material is the iron ore commonly referred to as taconite, an iron-bearing sedimentary rock, typically having an iron oxide content of from about 15% to about 40%, with the balance being non-iron impurities. For purposes of the present disclosure, the term "taconite" is used to refer to any natural iron ore material that is composed of a mixture of one or more iron oxides and substantial amounts of one or more non-iron impurities.

Because the iron oxide material in many taconite formations is at least partially in the form of magnetite, which is a mineral strongly influenced by a magnetic field, technology was developed many decades ago that utilized low intensity magnetic fields to separate magnetite and other minerals strongly influenced by a magnetic field, such as, for example, martite, and maghemite, from the other materials in taconite ores. The term "low intensity magnetic separator" refers to a separator that separates highly magnetically susceptible particles such as magnetite particles from particles that are weakly susceptible or non-susceptible to a magnetic field. Low intensity magnetic separators effect separation by subjecting a stream of mixed particles to a relatively low magnetic field having a strength. A wide variety of such separators, some of which are structured to separate a feed stream of dry particles and others structured to separate a feed stream of particles suspended in water (i.e., slurries), are described in the prior art. Low intensity magnetic separators are effective to separate the taconite ore into a magnetite concentrate fraction, which includes a higher concentration of magnetite than the starting taconite ore, and a tailings fraction, which includes a higher concentration of the non-magnetite materials than the starting particulate taconite ore.

Taconite ores, in addition to including magnetite, typically also include substantial amounts of iron oxides in the form of hematite or other iron oxides that are only weakly influenced by magnetic fields. In a low intensity magnetic separator, these non-magnetite iron oxides pass into the tailings fraction of the low intensity magnetic separation operation together with non-iron impurities. A substantial quantity of taconite tailings from prior low intensity magnetic separation operations have been placed in reject tailings deposition basins through the years. Other tailings materials that also include usable quantities of iron oxides include, for example, iron oxide tailings from natural iron ore wash, density separation, sluicing plants, or heavy media processing plants. In addition, other taconite ores and other iron-bearing ores have been mined and ground to particulate form, but subsequently deemed unsuitable for further processing with low intensity magnetic separators due to a determination that they include insufficient quantities of magnetite to make the operation economically feasible. Many tons of such materials have been placed in lean ore stockpiles. These tailings basins and stockpiles represent a collection of elements in a form that already has considerable energy, manpower and "carbon footprint" invested into the mining and size reduction of the rock involved and therefore such occurrences have even greater economic and environmental appeal in view of concerns regarding pollution and climate change. For purposes of the present disclosure, such tailings and stockpiled lean ores (whether referred to as taconite ores or by another name), together with lean ores in their natural state (i.e., unmined and/or unground), whether or not they include some amount of magnetite, and whether they include hematite, iron oxides other than hematite, or both, are referred to herein as "low grade mineral assemblages."

Economically feasible extraction of iron oxides from low grade mineral assemblages, whether present in their natural state, in lean or stockpiles or in tailings of prior mining or mineral processing operations, requires the use of energy efficient processes effective to separate the low grade mineral assemblages into a particulate fraction that includes iron oxides having iron concentrations that are sufficiently increased to have commercial value (referred to herein as a "concentrate"). The separation process can be very simple, involving few unit processes, or very complex, involving many unit processes. Substantial attention has been given over many decades to the development of processes for producing a concentrate from low grade mineral assemblages. Generally, such processes involve one or more unit processes within the general categories of comminution, separation and dewatering.

Comminution (also referred to as size reduction) typically involves crushing, followed by grinding, to reduce the size of the ore to a point that the minerals are liberated from one another and to prepare the material for physical and/or chemical separation. Comminution by crushing and/or grinding can be accomplished using, for example, a cone crushing device, a jaw crushing device, a roll press, a rod mill, a ball mill or a tower mill, each of which is well known in the relevant field and commercially available. In the case of tailings and lean ore stockpiles, the low grade ore materials have already been comminuted to a certain degree; however, further comminution may be required in some cases to optimize iron oxide recovery.

Once the ore has been sized, the mineral assemblages are then separated into fractions by one or more of the following unit processes: size separation, gravity separation, electrical or magnetic separation and froth flotation. Size separation uses the difference in particle size of the different minerals (e.g., washing clay from sand on a screen). Gravity separation uses the difference in density or specific gravity of the minerals. Equipment commonly used for gravity separation includes dense or heavy media, shaking tables, spirals, barrel washers, or jigs. Electrical or magnetic separation uses those respective physical properties of the minerals to effect separation. Froth flotation uses surface chemistry differences in the minerals. As will be appreciated by a person of ordinary skill in the art, the term "separated" as used herein is not intended to require complete separation of iron oxides from gangue materials, but rather refers to the separation of the low grade ore material into a fraction having a higher concentration of iron oxides/lower concentration of gangue materials (referred to herein as a "concentrate fraction") and a fraction having a lower concentration of iron oxides/higher concentration of gangue materials (referred to herein as a "tailings fraction"). An object of all large-scale separation processes is to optimize the efficiency, productivity and profitability of the separation process by balancing the degree of separation of iron oxides from non-iron materials present in a mineral assemblage with the cost of each incremental increase in the degree of separation.

To use the above separation unit processes, a mineral assemblage typically must first be put into a slurry form. The term "slurry" is used herein to refer to a fluid-mineral suspension of the mineral assemblage in which the mineral particles are suspended in liquid water. A mineral assemblage can be provided as a slurry by mixing the mineral assemblage with water either during or subsequent to mining excavation of the mineral assemblage. Because the above separation unit processes require the suspension of the low grade mineral assemblage in water to form a slurry prior to the separation treatment, the resulting concentrate fraction slurry and tailings fraction slurry, respectively, need to be dewatered so they can be transported (in the case of concentrate) or disposed of in an environmentally acceptable manner (in the case of tailings). Examples of dewatering devices that can be used for this purpose include deslimers, hydro-cyclones, spiral classifiers, thickeners, clarifiers, vacuum filters, pressure filters, multi-roll filters, centrifuges and elutriator sumps. A variety of suitable dewatering devices are known in the art and are available commercially, and it is well within the purview of a skilled artisan in view of the present descriptions to select, obtain and use a suitable dewatering device in the methods described herein.

Substantial efforts have been made to develop processes for producing iron oxide concentrates from low grade mineral assemblages. Until recently, however, such processes had not proven to be sufficiently effective, or sufficiently economically feasible, for use on a large scale. Recent developments in magnetic separation technology, however, have provided breakthroughs that enable extraction of large volumes of weakly magnetically susceptible iron oxides from low grade mineral assemblages. In these processes, a particulate mineral assemblage is suspended in water and the resulting aqueous suspension is passed through a magnetic separator that produces a relatively high intensity magnetic field, to separate the mineral assemblage into a concentrate fraction having a higher iron oxide concentration than the mineral assemblage and a tailings fraction having a lower iron oxide concentration than the mineral assemblage. Due to the relatively strong magnetic field that is necessary to influence the trajectories of iron oxides that are only weakly susceptible to magnetic fields, and the need to suspend the low grade mineral assemblages in water to form a slurry before passage through the magnetic field, devices that are used in this type of process have come to be referred to as wet high-intensity magnetic separation devices, or WHIMS devices.

One type of WHIMS device includes flux amplifying matrix materials to provide points of high magnetic attraction within a flow path through which a mineral assemblage slurry is passed. Such devices are a particular subset of the more general WHIMS category of magnetic separators, and are referred to herein as WHIMS-FAM devices (Wet High Intensity Magnetic Separation using Flux Amplifying Matrix). A WHIMS-FAM device defines at least one flow path (and typically several flow paths) for passage of aqueous slurries of the mineral assemblages in particulate form, includes sources of at least one (and typically several) high intensity magnetic field whose flux lines pass through the flow path, and include flux amplifying matrix materials contained within the flow path. The flux amplifying matrix can be, for example, iron or steel shot, steel rods, steel wool, steel parallel plates, wire mesh, machined iron or steel plates, V-shaped steel parallel plates, iron or steel hex nuts, or other discrete iron or steel pieces or shapes. The flux amplifying matrix operates in a high intensity magnetic separation device by concentrating flux lines between magnet poles so as to produce localized points of very high magnetic attraction within the slurry flow path, which attract faintly magnetic particles to separate the faintly magnetic particles from non-magnetic mineral particles. Using discrete object flux amplifying matrix materials in a high intensity magnetic separator, a higher concentration of flux lines can be achieved, producing higher localized magnetic field strengths at the contact points between the discrete objects when present in a magnetic zone.

By intermittently passing the matrix materials into a magnetic field where a low grade mineral assemblage treatment slurry is passed in contact with the flux amplifying matrix and iron oxide particles are held in contact with the matrix, and then out of the magnetic field to flush the iron oxide particles from the matrix, the mineral assemblage slurry can be separated into a concentrate fraction and a tailings fraction. Examples of WHIMS-FAM devices are those described in U.S. Pat. No. 7,886,913, issued Feb. 15, 2011, U.S. Pat. No. 8,292,084, issued Oct. 23, 2012, and U.S. patent application Ser. No. 13/452,420, filed Apr. 20, 2012, each of which is incorporated herein by reference in its entirety.

One challenge that has been encountered in the use of WHIMS-FAM devices is that they tend to become clogged during normal operation. For example, debris and organic matter such as leaves and vegetation, and/or oversize particles in the treatment slurry and/or magnetite or other highly magnetically susceptible particles or objects can become lodged in the matrix, and then additional particles can build up thereon irrespective of their magnetic susceptibilities. This particle build up can significantly impair the flow of a treatment slurry through the flow path, resulting in substantial productivity losses. One manner in which the clogging problem has been addressed is to use pre-separation slurry preparation steps to carefully control the particle sizes in the treatment slurries to be introduced into such devices, to carefully remove debris and organic matter such as leaves and vegetation, and/or oversize particles from the treatment slurry and to remove magnetite particles from the treatment slurry. Another approach for addressing the clogging problem has been to implement back-flushing steps in the separation process and/or to develop separator devices in which matrix material components and/or other separator components that contain matrix materials can be quickly replaced without causing unacceptable delays and shutdown times for the separators.

Another challenge associated with the use of WHIMS-FAM devices is that there is a practical limitation to the volume of slurry that can be treated in a given period of time. One cause of this limitation is the nature of the slurry flow paths in such a separator. Because the flow paths contain relatively high surface area flux amplifying matrix materials and because thorough separation of weakly magnetic particles in the mineral assemblage from non-magnetic materials requires thorough contact between the treatment slurry and the matrix materials, a substantial amount of turbulence and mixing of the slurry occurs in the flow path. As a result, the volumetric rate at which slurry can pass through the WHIMS-FAM device is limited.

Yet another challenge associated with iron ore upgrading processes utilizing WHIMS-FAM separator devices is that the processes required to provide a treatment slurry in a form suitable to be passed through a WHIMS-FAM device require the addition of a substantial amount of process water to the slurry. For example, when passing mineral assemblage slurries through screening devices and other size separators, a significant amount of process water is added to agitate the feed material, to rinse undersize particles through the screen and to remove oversize particles from the screen to an oversize fraction. As a result, in order to efficiently operate the separator, a substantial amount of excess water must subsequently be removed from the treatment slurry prior to introduction of the treatment slurry into a WHIMS-FAM separator.

Excess water can be removed from a slurry by passing the slurry through a dewatering device, such as, for example, a deslimer, hydrocyclone, thickener, hydroseparator or elutriator sump. The overflow water from the dewatering device(s) can be conveyed to a reservoir or a settling pond and can optionally be recycled for further use in the process as process water. However, because low grade mineral assemblages often include fine or ultrafine particles (e.g., particles having dimensions of less than about 100 microns), these dewatering treatments can result in substantial losses of iron oxide materials in the overflow streams of the dewatering device, and associated loss of productivity of the process. The dewatering step(s) theoretically could be omitted to prevent this loss of ultrafine particles; however, eliminating the dewatering step(s) would also result in unacceptable productivity losses due to the lower solids to water ratio that would result and the limitations on volumetric flow rates through a WHIMS-FAM device, as discussed above.

In addition, process water is also used within a WHIMS-FAM separator to rinse and flush collected iron oxide particles from the flux amplifying matrix into a concentrate fraction after it moves out of a magnetic zone. Therefore, an iron oxide concentrate fraction recovered from a WHIMS-FAM device also must be dewatered to produce a final concentrate product. The concentrate fraction slurry also can be dewatered by passage of the slurry through a dewatering device, such as, for example, a deslimer, hydrocyclone, thickener, hydroseparator or elutriator sump prior to filtering and/or other final drying operations, and the overflow water from such a dewatering device can also be conveyed to a reservoir or settling pond and optionally can be recycled for further use in the process as process water. Dewatering operations used to dewater the final concentrate fraction recovered from a WHIMS-FAM device, however, are also susceptible to the same problems discussed above, i.e., the unintentional loss of fine or ultrafine iron ore particles into an overflow stream removed from the dewatering device(s), which also can result in substantial losses of iron oxide materials, and associated loss of productivity of the process.

There is an ongoing need, therefore, for advancements relating to the recovery of iron oxide from low grade mineral assemblages and, in particular, advancements in the productivity of WHIMS-FAM devices. The present disclosure addresses this need.

SUMMARY

This invention relates generally to a process of upgrading low grade mineral assemblages in which an iron oxide concentrate is produced using a WHIMS-FAM process. More particularly, the invention relates to processes in which an additive is mixed with a treatment slurry prior to or concurrently with dewatering the treatment slurry prior to passage through a WHIMS-FAM device and/or an additive is mixed with an iron oxide concentrate fraction recovered from a WHIMS-FAM device prior to or concurrently with a dewatering treatment. Inclusion of the additive has surprisingly been found to confer unexpected advantages to the process, including a reduction in the loss of ultrafine particles in overflow streams from the dewatering devices, increase in the percent solids of a thickened treatment slurry that can be processed in a WHIMS-FAM device, reduction of the volume loading of the WHIMS-FAM device relative to the mass flow rate of solid particles through the device, reduction in the occurrence of plugging of the flux amplifying matrix and increase of the volumetric speed with which treatment slurry passes through a WHIMS-FAM device. The processes disclosed herein enable the processing of finer feed materials (i.e., feed materials having substantial quantities of particles less than 100 microns), which were previously believed to be unsuitable for processing in a WHIMS-FAM device. In addition, the processes disclosed herein enable the processing of thickened slurries having greater solids contents than previously believed possible in a WHIMS-FAM device.

The present disclosure provides methods, processes and systems that separate weakly magnetic particles from mineral assemblages that include a mixture of the weakly magnetic particles with non-magnetic particles, such as, for example, low grade mineral assemblages that include hematite and possibly other iron oxides along with non-iron minerals, such as, for example, silica, other oxides, carbonate, silicates and hydrates. The methods, processes and systems disclosed herein are particularly useful for recovering weakly magnetic minerals from mineral assemblages contained in tailings basins that contain tailings from prior mining operations in the Biwabik Iron Formation of Minnesota. The methods, processes and systems are uniquely suited for maximizing productivity of WHIMS-FAM devices and systems.

In one aspect of the present disclosure, slurries of low grade mineral assemblages are mixed with a flocculant prior to or concurrently with dewatering the slurry and prior to introduction into a WHIMS-FAM device. In another aspect, a flocculant is mixed with an iron oxide concentrate slurry recovered from a WHIMS-FAM device prior to or concurrently with dewatering of the concentrate slurry. In yet another aspect, a process includes adding a flocculant to a slurry of a low grade mineral assemblage as described above and also adding a flocculant to a concentrate slurry as described above. The flocculant added to the mineral assemblage slurry can be the same flocculant as that added to the concentrate slurry or can be a different flocculant in alternative embodiments. The various aspects of this disclosure have been found to confer surprising and unexpected productivity improvements to processes that produce iron oxide concentrate using a WHIMS-FAM device.

Further embodiments, forms, features, advantages, aspects, and benefits shall become apparent from the following descriptions.

BRIEF DESCRIPTION OF THE DRAWINGS

FIG. 1 is a process flow diagram, with projected mass balance data, of a process for producing an iron ore concentrate according to one embodiment of the disclosure.

DETAILED DESCRIPTION

For the purpose of promoting an understanding of the principles of the invention, reference will now be made to various embodiments and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In one aspect, the present disclosure involves the discovery that the productivity of a WHIMS-FAM device can be significantly and unexpectedly increased by mixing a flocculant into a treatment slurry of a low grade mineral assemblage and dewatering the treatment slurry to increase the solids to water ratio of the treatment slurry prior to contacting the treatment slurry with a flux amplifying matrix in a wet high intensity magnetic separator. In another aspect, the present disclosure involves the discovery that the productivity of a process for producing iron oxide concentrate utilizing a WHIMS-FAM device can be significantly and unexpectedly increased by mixing a flocculant into a concentrate slurry fraction recovered from the WHIMS-FAM and dewatering the concentrate slurry fraction prior to passing the concentrate slurry fraction through a disc filter or other type of filtering device to produce an iron oxide concentrate filter cake.

In one embodiment, a method for producing an iron oxide concentrate includes: (i) mixing a flocculant into a treatment slurry including a particulate low grade mineral assemblage suspended in water, (ii) increasing the solids to water ratio in the treatment slurry by introducing the treatment slurry into a dewatering device, recovering overflow water from the dewatering device and recovering a thickened treatment slurry from the dewatering device, (iii) introducing the thickened treatment slurry into a wet high-intensity magnetic separation device, the device defining a slurry flow path that contains a flux amplifying matrix, and the device operable to generate a high intensity magnetic field having flux lines that pass through the flow path; and (iv) recovering a final concentrate fraction and a final tailings fraction from the separation device.

As used herein, the term "treatment slurry" refers to a suspension of solid particles of a low grade mineral assemblage (i.e., a mixture of iron oxide particles and non-iron particles) in water that is in a form suitable for introduction into a WHIMS-FAM device. In one embodiment, the treatment slurry is one that has been prepared using one or more unit processes to remove rocks, debris and organic matter such as roots, tree branches, leaves and vegetation, and/or oversize particles (e.g., using tramp screens, grizzly screens or other wet screens) and/or to remove oversize particles (e.g., using tramp screens, grizzly screens, spiral classifiers, vibratory screens or other wet screens) and/or to crush or grind oversize particles (e.g., using cone crushing devices, jaw crushing devices, roll presses, rod mills, ball mills or tower mills) and/or to separate magnetite and/or other highly magnetically susceptible particles from the mineral assemblage (e.g., using low intensity magnetic separation). In one embodiment, the treatment slurry has a solids content of from about 20% to about 40%. In one embodiment, the treatment slurry is substantially free from magnetite particles. As used herein, the phrase "substantially free from magnetite particles" means that the treatment slurry does not include magnetite particles in a quantity that would significantly interfere with the flow of the treatment slurry through a WHIMS-FAM device.

While a treatment slurry as described above is in a form suitable for introduction into a WHIMS-FAM device, the further conditioning of the treatment slurry as described herein, i.e., by mixing a flocculant into the treatment slurry and dewatering the treatment slurry, provides a conditioned treatment slurry that exhibits surprising and unexpected advantages. The flocculant can be added to the treatment slurry at any convenient point prior to or concurrent with passage of the treatment slurry into a dewatering device, or can be delivered into a slurry of a low grade mineral assemblage prior to the preparation of a treatment slurry using one or more of the above-mentioned unit processes, if desired.

The flocculant is a compound or substance that is operable to aggregate single solid particles or small groups of particles into multi-particle aggregates or 'flocs' that have a greater tendency to sink in a dewatering device with larger particles in the slurry, and therefore have a greater likelihood of being present in a thickened slurry recovered from the dewatering device. Stated alternatively, flocs are less likely to be lost in an overflow stream removed from the dewatering device. The flocculant is mixed into the treatment slurry in an effective amount. As used herein, the term "effective amount" refers to an amount that increases the productivity of a WHIMS-FAM process for producing an iron oxide concentrate. In one embodiment, the flocculant is mixed into the treatment slurry in an amount effective to achieve diversion of a majority of the ultrafine particles from the overflow water to the thickened treatment slurry recovered from the dewatering device. As used herein, the phrase "diversion of a majority of the ultrafine particles from the overflow water to the thickened treatment slurry" means that the amount of particulate material lost to the overflow water with the addition of the flocculant is less than half, by weight, of the amount of particulate material that would be lost to the overflow water absent the flocculant.

In one embodiment, the amount of flocculant mixed into the treatment slurry is an amount whereby the overflow water of the dewatering device has a slight discoloration. The slight discoloration of the overflow water in this embodiment indicates that a small amount of particulate matter is still being removed from the treatment slurry in the overflow water; however, an amount of flocculant based upon a slight discoloration in the overflow water of the dewatering device ensures that the treatment slurry is not being over-dosed with flocculant.

The term "amount" as used above in connection with the addition of a flocculant to a treatment slurry is based on a desired ratio of the quantity of flocculant mixed with the treatment slurry relative to the quantity of treatment slurry into which the flocculant is mixed. As will be appreciated by a person skilled in the art in view of the present descriptions, because the processes described herein involve continuous or nearly continuous flow of the treatment slurry, the flocculant will typically be continuously metered into and mixed with a flow stream of the treatment slurry.

The flocculant can be mixed into the treatment slurry or other flow stream in a wide variety of manners. Any suitable method of addition known in the art may be utilized. For example, in one manner of incorporating the flocculant into a slurry, the flocculant is provided in a dry powder form that is mixed at a predetermined rate directly into a treatment slurry flow stream, for example, in a flow-through mixing tank or other receptacle that includes stirring baffles or the like to ensure thorough stirring. In another embodiment, the flocculant is first mixed into water in a separate mixer or tank to dissolve or disperse the flocculant in the water and then the solution or suspension of the flocculant is metered into a treatment slurry flow stream at a predetermined rate to achieve a desired proportion of flocculant (by mass or by volume) in the treatment slurry. This manner of addition allows for adequate dilution of the flocculant to enhance dispersion of the flocculant throughout the treatment slurry.

In one embodiment, the flocculant and the treatment slurry are continuously conveyed into a mixing vessel at predetermined rates based upon the desired proportion of flocculant to treatment slurry in the final mixture. In another embodiment, the flow rate of the flocculant into a mixing vessel is variable and is under the control of an operator or a control system. For example, the control system can include a flow rate sensor that measures the volumetric flow of the treatment slurry into the mixing vessel and/or a density sensor for the treatment slurry flow stream and an operating system for controlling the flow rate of the flocculant based upon these and/or other measurements. In any of these embodiments, a conditioned treatment slurry (i.e., a mixture of the flocculant and the treatment slurry) can be recovered from the mixing vessel for subsequent dewatering. Mixing of the flocculant and the treatment slurry in the mixing vessel can be achieved simply by the turbulence generated by the flow of the treatment slurry into or through the mixing vessel or by baffles or other turbulence inducers or by the injection of water within the mixing vessel. If desired, mechanical rotors, static mixers or other mechanical mixing apparatus can be provided to achieve suitable mixing of the flocculant into the treatment slurry for sufficient flocculation. In one embodiment, the mixing vessel is a pipe or other conduit. In another embodiment, the mixing vessel is a sump, tank or other larger receptacle.

In one embodiment, the flocculant is provided in a liquid or emulsion form and the flocculant is conveyed into the mixing vessel in such liquid or emulsion form for mixing with the treatment slurry. For example some synthetic flocculant formulations available commercially are provided in combination with carrier emulsions, such as, for example, oil in water emulsions. Of course, even a flocculant provided or obtained as a solid powder can first be mixed with water prior to being mixed with a treatment slurry as discussed above, in which case the flocculant conveyed into the mixing vessel or otherwise into a treatment slurry flow stream will be in a liquid form.

In one embodiment the flocculant is mixed into the treatment slurry before the treatment slurry is introduced into a dewatering device. In another embodiment, the flocculant is mixed into the treatment slurry in the dewatering device. In this embodiment, the dewatering device itself operates as the mixing vessel.

The flocculant can be any water-soluble or water-dispersible flocculant that is capable of promoting flocculation and therefore retention of iron oxide fines in a thickened treatment slurry recovered from a dewatering device and that is suitable for processing in a WHIMS-FAM device as described herein. In one embodiment, the flocculant mixed with the treatment slurry is a flocculant that is operable to bind solid particles in a low grade mineral assemblage slurry indiscriminately, i.e., is not mineral specific. In another embodiment, the flocculant is a selective flocculant, provided that iron oxide particles in the treatment slurry are among the particles agglomerated by the selective flocculant. For example, hydroxamated polyacrylamide has been reported to selectively flocculate iron oxide from other minerals.

In one embodiment, the flocculant is a synthetic polymer flocculant, a wide variety of which can be prepared in numerous variations and a wide variety of which are available commercially. In one embodiment, the flocculant is a water-soluble flocculant formed from one or more ethylenically unsaturated monomers. The particular type of flocculant selected for use in a given process may depend upon the nature of the surface of the suspended solids and other factors such as pH. Such features can be determined by a person skilled in the art in view of the present disclosure without undue experimentation.

In one embodiment, the synthetic polymer flocculant is a polyacrylamide flocculant. The term "polyacrylamide" is used herein to refer both to a polyacrylamide homopolymer and also to copolymers that include acrylamide monomers and one or more comonomers. Acrylamide monomer, a nonionic, is a popular basic building block for water soluble polymers because of its price and availability. It may be homopolymerized to obtain nonionic polymers, and it is frequently copolymerized with one or more comonomers that confer upon the resulting polymer an anionic, cationic or amphoteric nature. For example, acrylamide monomers can be copolymerized with ethylenically unsaturated carboxylic or sulfonic monomers such as acrylic acid, methacrylic acid and 2-acrylamido-2-methyl propanesulfonic acid (AMPS) and other monomers including acid groups to produce anionic polymer flocculants. In one embodiment, the flocculant used is an anionic flocculant. In another embodiment, the flocculant is a copolymer of from about 5% to about 70% by weight, or from about 10% to about 50% by weight, anionic monomers such as acrylic acid (e.g., sodium acrylate) and/or AMPS with other monomers, generally acrylamide. Similarly, acrylamide monomers can be copolymerized with comonomers that include primary, secondary, tertiary, or quaternary amine groups, such as, for example, dialkylaminoalkyl(meth)-acrylates and -acrylamides, usually as their quaternary ammonium or acid addition salts, or diallyl dimethyl ammonium chloride, to produce cationic polymer flocculants. In one embodiment, the flocculant used is a cationic flocculant. In another embodiment, the flocculant is formed of from about 1% to about 50% by weight, or from about 2% to about 15% by weight, of cationic monomers such as, for example, dimethyl aminoethyl-acrylate or -methacrylate acid additions or quaternary salts together with other monomers, generally acrylamide. The flocculant can be synthesized in a known manner, for example by gel polymerization, reverse phase bead polymerization, or reverse phase emulsion polymerization or by any other suitable technique.

In one embodiment, the polymer additive is an anionic polyacrylamide polymer. A suitable polymer for use as described herein is the product NS6850, which is a water soluble flocculant commercially available from Neo Solutions, Inc. (Beaver, Pa.). This flocculant is effective to bind all or substantially all of the fines particles (whether iron oxide particles or non-iron particles) in an aqueous slurry of a taconite tailings material in a dewatering operation as described herein. Use of this product in a WHIMS-FAM process as described herein has been shown to confer surprising and unexpected iron oxide concentrate productivity increases compared to production of iron oxide concentrates in a WHIMS-FAM process operated under the same conditions save for the absence of the flocculant. In particular, during testing of this product, density readings on thickened treatment slurries recovered from a deslimer that had been mixed with this flocculant have been found to be as much as ten percentage points higher than the density of thickened treatment slurries produced under similar conditions without use of the flocculant. It is not intended, however, that the present disclosure be limited to this particular product or this particular type of polymer, it being understood that alternative flocculants having similar operability are also contemplated.

In one embodiment in which a synthetic polymer flocculant is employed, the flocculant is added to a treatment slurry in an amount (or, in the case of continuously flowing stream of slurry, at a rate) that results in a concentration of less than ten (10) parts per million (ppm) of the flocculant in the flow stream. In another embodiment the concentration is less than eight (8) ppm. In still other embodiments the concentration is less than six (6) ppm, less than four (4) ppm or less than two (2) ppm.

In one embodiment, a water soluble anionic polyacrylamide polymer known as NS6850 is diluted with water to a concentration of about 0.25% (by mass), which equates to about 2500 mg/L. This solution is then metered into a treatment slurry flow stream in proportions suitable for delivering a desired amount of the flocculant into the treatment slurry.

While it is not intended that the present disclosure be limited by any theory of operation, it is believed that the anionic polyacrylamide polymer flocculant causes aggregation of solid particles present in the dewatering device, possibly via electrical or electrostatic interactions, in an indiscriminate manner (but selective binding is acceptable as long as the flocculant binds particles that are desired to remain in the treatment slurry, i.e., magnetically susceptible particles). The aggregations cause the solid particles to tend to sink toward the bottom of the dewatering device, reducing the amount of particulate material that exits the dewatering device as overflow. As will be appreciated by a person of ordinary skill in the art, in the absence of the flocculant, the overflow would typically be expected to include a quantity of the particulate material in the slurry, particularly some of the fine and/or ultrafine particles in the slurry, which are more likely to be carried in the overflow of the dewatering device. However, the presence of the flocculant increases the probability of such particles sinking in the dewatering device, and thereby remaining in the thickened treatment slurry drawn from the bottom of the dewatering device.

The amount of the flocculant metered into the dewatering device can be adjusted to a level at which the dewatering device overflows clear water, i.e., water with very few solids. Alternatively, the amount of flocculant metered into the dewatering device can be set to a level whereby the overflow has a slight coloration, indicating that a small amount of particulate matter is in the overflow. This slight coloration indicates that the polymer is not being overdosed into the dewatering device (but rather is being slightly underdosed) relative to the amount that would correspond exactly to the amount needed to retain all of the particulate material in the underflow of the dewatering device.

Following addition of a flocculant to a treatment slurry as described above and dewatering of the treatment slurry, the thickened treatment slurry recovered from the bottom of the dewatering device can be delivered to a WHIMS-FAM device as a steady stream of flocculant-conditioned treatment slurry. In one embodiment the dewatering device used to thicken the treatment slurry is a deslimer. In alternative embodiments, dewatering can be achieved using, for example, one or more hydrocyclone, thickener, elutriator sump or other dewatering device.

In addition to, or as an alternative to, use of a flocculant in the preparation of a treatment slurry prior to introduction into a WHIMS-FAM separator as described above, a flocculant can also be used in connection with the processing of a final concentrate recovered from a WHIMS-FAM separator to increase the recovery of target iron oxide particles. For example, the final concentrate slurry recovered from a WHIMS-FAM separator as described herein is typically dewatered to produce a final concentrate filter cake. Such dewatering can include, for example, passage of the final concentrate fraction through a deslimer, hydrocyclone, thickener, elutriator sump or the like to remove excess water prior to filtration. For example, in an elutriator sump, denser and/or larger particles tend to sink to the bottom of the sump and are pumped out of the device, while less dense and/or smaller particles tend to float to the top and overflow into a weir. The rise rate of particles in an inflow slurry can be modified by varying the flow streams into and out of the sump, thereby controlling the density/size separation function of the elutriator sump. It has been found that the amount of target iron oxide material recovered during such dewatering phase can be significantly increased by mixing a flocculant with the final concentrate slurry prior to such dewatering treatment. In an elutriator sump, for example, the use of a flocculant accelerates the settling rate of the particles present in the slurry, thereby enabling the elutriator sump to operate as a dewatering device wherein particles tend to settle at the bottom and water overflows out the top.

A flocculant can be mixed with a final concentrate slurry in the same manner as described above in connection with mixing a flocculant with a treatment slurry, and the above descriptions of same are considered equally applicable to this aspect of the disclosure as if fully restated here. In one embodiment, a method for producing an iron oxide concentrate includes: (i) introducing a treatment slurry including a particulate mineral assemblage suspended in water into a wet high-intensity magnetic separation device, the device defining a slurry flow path that contains a flux amplifying matrix, and the device operable to generate a high intensity magnetic field having flux lines that pass through the flow path; (ii) recovering a concentrate fraction slurry and a tailings fraction slurry from the separation device; (iii) mixing a flocculant into the concentrate fraction slurry; and (iv) increasing the solids to liquid ratio in the concentrate fraction slurry by introducing the concentrate fraction into a dewatering device, recovering overflow water from the dewatering device and recovering a thickened concentrate fraction slurry from the dewatering device.

In one suitable manner for introducing a flocculant into the final concentrate slurry, for example, an aqueous solution or dispersion of the flocculant is fed into the final concentrate slurry as it passes through a dewatering device, such as, for example, a thickener or elutriator sump, which operates by partially stagnating the flow of slurry to a degree sufficient to allow the solids in the concentrate slurry to settle. For example, a flocculant solution or dispersion as described herein can be added to the influent launder of the thickener in a predetermined proportion to the amount of concentrate slurry being conveyed to the thickener in order to reduce the loss of particles, particularly finished high grade fines, that would otherwise be lost in the separated water streams recovered as overflow from the thickener.

In one embodiment in which a synthetic polymer flocculant is employed, the flocculant is added to a concentrate slurry in an amount (or, in the case of continuously flowing stream of slurry, at a rate) that results in a concentration of less than eight (8) parts per million (ppm) of the flocculant in the flow stream. In other embodiments the concentration is less than six (6) ppm, less than four (4) ppm or less than two (2) ppm.

As will be appreciated by a person skilled in the art in view of the above descriptions, in one aspect of the present disclosure, there is provided a method for producing an iron oxide concentrate that includes: (i) mixing into a treatment slurry including a particulate low grade mineral assemblage suspended in water a synthetic anionic polyacrylamide polymer in an amount to provide a flocculant concentration in the slurry of from about 1 ppm to about 10 ppm on a weight to weight basis of the flocculant relative to the solids in the treatment slurry; (ii) increasing the solids to water ratio in the treatment slurry by introducing the treatment slurry into a dewatering device, recovering overflow water from the dewatering device and recovering a thickened treatment slurry from the dewatering device; (iii) introducing the thickened slurry into a wet high-intensity magnetic separation device, the device defining a slurry flow path that contains a flux amplifying matrix, and the device operable to generate a high intensity magnetic field having flux lines that pass through the flow path; and (iv) recovering a final concentrate fraction and a final tailings fraction from the separation device.

In one embodiment of the method, the mixing comprises mixing the flocculant into the treatment slurry before the treatment slurry is introduced into the dewatering device. In another embodiment, the mixing comprises mixing the flocculant into the treatment slurry in the dewatering device. In yet another embodiment, the flocculant is mixed into the treatment slurry in an amount effective to achieve diversion of a majority of the ultrafine particles from the overflow water to the thickened treatment slurry recovered from the dewatering device. In still another embodiment, the flocculant is mixed into the treatment slurry at a concentration of from about 1 ppm to about 8 ppm. In still yet another embodiment, the treatment slurry is substantially free from magnetite particles.

In another aspect, the present disclosure provides a method for producing an iron oxide concentrate that includes: (i) mixing a flocculant into a treatment slurry including a particulate low grade mineral assemblage suspended in water; (ii) increasing the solids to water ratio in the treatment slurry by introducing the treatment slurry into a dewatering device, recovering overflow water from the dewatering device and recovering a thickened treatment slurry from the dewatering device; (iii) introducing the thickened slurry into a wet high-intensity magnetic separation device, the device defining a slurry flow path that contains a flux amplifying matrix, and the device operable to generate a high intensity magnetic field having flux lines that pass through the flow path; and (iv) recovering a final concentrate fraction and a final tailings fraction from the separation device.

In one embodiment of the method, the mixing comprises mixing the flocculant into the treatment slurry before the treatment slurry is introduced into the dewatering device. In another embodiment, the mixing comprises mixing the flocculant into the treatment slurry in the dewatering device. In yet another embodiment, the flocculant is mixed into the treatment slurry in an amount effective to recover a majority of the ultrafine particles in the thickened treatment slurry. In still another embodiment, the flocculant is mixed into the treatment slurry at a concentration of from about 1 ppm to about 10 ppm. In still yet another embodiment, the flocculant is mixed into the treatment slurry at a concentration of from about 1 ppm to about 8 ppm. In yet still another embodiment, the slurry is substantially free from magnetite particles.

In one embodiment of the method, the flocculant comprises a synthetic polymer flocculant. In another embodiment, the flocculant comprises an anionic polymer flocculant. In yet another embodiment, the flocculant comprises a polyacrylamide polymer. In still another embodiment, the polyacrylamide polymer comprises an anionic polyacrylamide. In one embodiment, the flocculant comprises a non-selective flocculant. In another embodiment, the flocculant is operable to flocculate iron ore particles in the slurry.

In one manner of practicing the method, the mixing and passing comprises introducing the flocculant into the dewatering device through a first inlet positioned near a second inlet for conveying the treatment slurry into the dewatering device. In another manner of practicing the method, the passing comprises passing the mixture through a deslimer with the underflow of the deslimer comprising the thickened slurry. In one embodiment, the dewatering device is selected from the group consisting of hydro-cyclones, spiral classifiers, thickeners, clarifiers, vacuum filters, pressure filters, multi-roll filters, centrifuges and elutriator sumps. In another embodiment, the mineral assemblage slurry comprise non-magnetically susceptible particles and weakly magnetically susceptible particles. For example, the non-magnetically susceptible particles can comprise silica and the weakly magnetically susceptible particles can comprise iron minerals other than magnetite. In one embodiment, the flux amplifying matrix comprises a plurality of discrete objects. In another embodiment, the plurality of discrete objects comprise a member selected from the group consisting of steel shot and iron shot. In yet another embodiment, the flux amplifying matrix comprises wire mesh having significant magnetic susceptibility. In one embodiment, the mineral assemblage slurry comprises iron ore tailings generated by a mineral processing plant. For example and without limitation, the mineral processing plant can be a natural ore wash plant, a taconite mineral beneficiation plant, or a natural ore heavy media plant.

In another aspect of the present disclosure, there is provided a method for producing an iron oxide concentrate that includes: (i) introducing a treatment slurry including a particulate mineral assemblage suspended in water into a wet high-intensity magnetic separation device, the device defining a slurry flow path that contains a flux amplifying matrix, and the device operable to generate a high intensity magnetic field having flux lines that pass through the flow path; (ii) recovering a concentrate fraction slurry and a tailings fraction slurry from the separation device; (iii) mixing a flocculant into the concentrate fraction slurry; and (iv) increasing the solids to liquid ratio in the concentrate fraction slurry by introducing the concentrate fraction into a dewatering device, recovering overflow water from the dewatering device and recovering a thickened concentrate fraction slurry from the dewatering device.

In one embodiment of the method, the mixing comprises mixing the flocculant into the concentrate fraction slurry before the concentrate fraction slurry is introduced into the dewatering device. In another embodiment, the mixing comprises mixing the flocculant into the concentrate fraction slurry in the dewatering device. In yet another embodiment, the flocculant is mixed into the concentrate fraction slurry in an amount effective to recover a majority of the ultrafine particles in the thickened concentrate fraction slurry. In still another embodiment, the flocculant is mixed into the concentrate fraction slurry at a concentration of from about 0.5 ppm to about 8 ppm. In still yet another embodiment, the flocculant is mixed into the concentrate fraction slurry at a concentration of from about 0.5 ppm to about 6 ppm.

Reference will now be made to the following Examples, which describe experimental work directed to the subject matter of the present disclosure. It is understood that no limitation to the scope of the disclosure is intended thereby. The Examples are intended to be illustrative, are provided solely to promote a full understanding of the concepts embodied in the disclosure, and are not intended to be limiting or otherwise restrictive as to the nature and scope of the inventions set forth herein.

EXAMPLES

As discussed above, in one embodiment a flocculant is mixed with a treatment slurry prior to or concurrently with dewatering and prior to introduction into a WHIMS-FAM device. In another embodiment, a flocculant is mixed with an iron oxide concentrate slurry recovered from a WHIMS-FAM device prior to or concurrently with dewatering of the concentrate slurry and prior to filtering the concentrate slurry to provide a concentrate filter cake. In yet another embodiment, a flocculant can be used at both stages of an iron oxide concentrate production process utilizing a WHIMS-FAM separator. The flocculant mixed with the treatment slurry and the flocculant mixed with the concentrate slurry can be the same flocculant or a different flocculant.

Example One

One example of a process that includes flocculant treatment at both stages is shown in FIG. 1, which is a process flow diagram with mass balance data. In the embodiment depicted in FIG. 1, a treatment slurry including about 32% solids (mass basis) suspended in water (identified in FIG. 1 as "Process Material") is conveyed into a deslimer at a rate of about 1500 gallons per minute. Process water is also conveyed into the deslimer at a rate of about 30 gallons per minute. A 2500 mg/L solution of the anionic polyacrylamide NS6850 is prepared and held in a separate tank, and is metered from the tank into the deslimer at a rate of approximately 1.42 gallons per minute (gpm). For example, the flocculant solution or dispersion can be pumped into a high pressure water line and fed into the deslimer through the water line at or near the treatment slurry inlet. At these rates of flow of the respective materials, the mixture of treatment slurry and flocculant in the deslimer provides a flocculant concentration of about 7.5 ppm on a weight to weight basis of the flocculant and the solids in the treatment slurry. While the rate of flocculant solution flow into the deslimer in the embodiment depicted in FIG. 1 is 1.42 gpm, it is understood that the rate can be modified to account for different flow rates of the Process Material, different solids content of the Process Material, different concentration of the flocculant solution, or different target flocculant loading ratios, for example. The flocculant solution is metered into the deslimer at a rate to provide a target amount of flocculant in proportion to the amount of slurry solids that are simultaneously being fed into the deslimer. In another embodiment, a 2500 mg/L polymer solution is metered into the deslimer at a rate of about 1 to about 2 gpm. In still another embodiment, a 2500 mg/L polymer solution is metered into the deslimer at a rate of about 1.2 to about 1.6 gpm. In yet another embodiment, a flocculant is metered into the deslimer at a rate effective to provide a flocculant concentration of about 1 to about 10 ppm on a weight to weight basis of the flocculant and the solids in the treatment slurry. In still yet another embodiment, a flocculant is metered into the deslimer at a rate effective to provide a flocculant concentration of about 1 to about 8 ppm on a weight to weight basis of the flocculant and the solids in the treatment slurry. The underflow of the deslimer comprises a thickened treatment slurry, which is then conveyed to a WHIMS-FAM device.

After the thickened treatment slurry is processed in the WHIMS-FAM device, the iron oxide concentrate slurry recovered from the WHIMS-FAM device is continuously conveyed into a thickener. A 2500 mg/L solution of the flocculant, as described above, is also metered into the thickener at a rate of about 0.2 gpm. In another embodiment, a 2500 mg/L polymer solution is metered into the thickener at a rate of about 0.05 to about 0.5 gpm. In still another embodiment, a 2500 mg/L polymer solution is metered into the thickener at a rate of about 0.1 to about 0.3 gpm. In yet another embodiment, a flocculant is metered into the deslimer at a rate effective to provide a flocculant concentration of about 0.5 to about 8 ppm on a weight to weight basis of the flocculant and the solids in the concentrate slurry. In still yet another embodiment, a flocculant is metered into the deslimer at a rate effective to provide a flocculant concentration of about 0.5 to about 6 ppm on a weight to weight basis of the flocculant and the solids in the concentrate slurry.

The underflow of the thickener comprises a thickened concentrate slurry, which is then conveyed to a vacuum filter device for final drying of the iron oxide concentrate produced by the WHIMS-FAM process.

While multiple embodiments of the invention have been described in detail in the foregoing description, the same is to be considered as illustrative and not restrictive in character, it being understood that only the selected embodiments have been described and that all changes, modifications and equivalents that come within the spirit of the invention as defined herein or by any of the following claims are desired to be protected. Any theory, mechanism of operation, proof, or finding stated herein is meant to further enhance understanding of the present disclosure and is not intended to make the present disclosure in any way dependent upon such theory, mechanism of operation, proof, or finding. It should be understood that any use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. All patents, patent applications, and publications references herein are hereby incorporated by reference, each in its entirety.

What is claimed is:

1. A method for producing an iron oxide concentrate, comprising:

mixing into a treatment slurry including a particulate low grade mineral assemblage suspended in water a flocculant comprising a synthetic anionic polyacrylamide polymer to provide a mixture, wherein the flocculant is mixed with the treatment slurry in an amount to provide a flocculant concentration in the mixture of from about 1 ppm to about 10 ppm on a weight to weight basis of the flocculant relative to the particulate low grade mineral assemblage in the treatment slurry;

increasing a ratio of the particulate low grade mineral assemblage to water in the mixture in a dewatering device, recovering overflow water from the dewatering device and recovering a thickened slurry from the dewatering device;

introducing the thickened slurry into a wet high-intensity magnetic separation device, the wet high-intensity magnetic separation device defining a slurry flow path that contains a flux amplifying matrix, and the wet high-intensity magnetic separation device operable to generate a high intensity magnetic field having flux lines that pass through the slurry flow path; and recovering a final concentrate fraction and a final tailings fraction from the wet high-intensity magnetic separation device;

wherein the final concentrate fraction comprises an iron oxide concentrate.

2. The method in accordance with claim 1 wherein said mixing comprises mixing the flocculant into the treatment slurry before the mixture is introduced into the dewatering device.

3. The method in accordance with claim 1 wherein said mixing comprises mixing the flocculant into the treatment slurry in the dewatering device.

4. The method in accordance with claim 1 wherein the particulate low grade mineral assemblage includes ultrafine particles and wherein the flocculant is mixed into the treatment slurry in an amount effective to achieve diversion of a majority of the ultrafine particles from the overflow water to the thickened slurry recovered from the dewatering device.

5. The method in accordance with claim 1 wherein the flocculant is mixed into the treatment slurry at a concentration of from about 1 ppm to about 8 ppm.

6. The method of claim 1 wherein the treatment slurry is substantially free from magnetite particles.

7. A method for producing an iron oxide concentrate comprising:

mixing a flocculant into a treatment slurry including a particulate low grade mineral assemblage suspended in water to provide a mixture;

increasing a ratio of the particulate low grade mineral assemblage to water in the mixture in a dewatering device, recovering overflow water from the dewatering device and recovering a thickened slurry from the dewatering device;

introducing the thickened slurry into a wet high-intensity magnetic separation device, the wet high-intensity magnetic separation device defining a slurry flow path that contains a flux amplifying matrix, and the wet high-intensity magnetic separation device operable to generate a high intensity magnetic field having flux lines that pass through the slurry flow path; and recovering a final concentrate fraction and a final tailings fraction from the wet high-intensity magnetic separation device;

wherein the final concentrate fraction comprises an iron oxide concentrate.

8. The method in accordance with claim 7 wherein said mixing comprises mixing the flocculant into the treatment slurry before the mixture is introduced into the dewatering device.

9. The method in accordance with claim 7 wherein said mixing comprises mixing the flocculant into the treatment slurry in the dewatering device.

10. The method in accordance with claim 7 wherein the particulate low grade mineral assemblage includes ultrafine particles and wherein the flocculant is mixed into the treatment slurry in an amount effective to recover a majority of the ultrafine particles in the thickened slurry.

11. The method in accordance with claim 7 wherein the flocculant is mixed into the treatment slurry at a concentration of from about 1 ppm to about 10 ppm.

12. The method in accordance with claim 7 wherein the flocculant is mixed into the treatment slurry at a concentration of from about 1 ppm to about 8 ppm.

13. The method of claim 7 wherein the treatment slurry is substantially free from magnetite particles.

14. The method of claim 7 wherein the flocculant comprises a synthetic polymer flocculant.

15. The method of claim 7 wherein the flocculant comprises an anionic polymer flocculant.

16. The method of claim 7 wherein the flocculant comprises a polyacrylamide polymer.

17. The method of claim 16 wherein the polyacrylamide polymer comprises an anionic polyacrylamide.

18. The method of claim 7 wherein the flocculant comprises a non-selective flocculant.

19. The method of claim 7 wherein the flocculant is operable to flocculate iron ore particles in the treatment slurry.

20. The method of claim 7 wherein said mixing and increasing comprises introducing the flocculant into the dewatering device through a first inlet positioned near a second inlet for conveying the treatment slurry into the dewatering device.

21. The method of claim 7, wherein said increasing comprises passing the mixture through a deslimer and recovering an underflow from the deslimer, wherein the underflow of the deslimer comprises the thickened slurry.

22. The method of claim 7 wherein the dewatering device is selected from the group consisting of hydro-cyclones, spiral classifiers, thickeners, clarifiers, vacuum filters, pressure filters, multi-roll filters, centrifuges and elutriator sumps.

23. The method of claim 7, wherein the treatment slurry comprise non-magnetically susceptible particles and weakly magnetically susceptible particles.

24. The method of claim 23, wherein the non-magnetically susceptible particles comprise silica and the weakly magnetically susceptible particles comprise iron minerals other than magnetite.

25. The method of claim 7, wherein the flux amplifying matrix comprises a plurality of discrete objects.

26. The method of claim 25, wherein the plurality of discrete objects comprise a member selected from the group consisting of steel shot and iron shot.

27. The method of claim 7, wherein the flux amplifying matrix comprises wire mesh having significant magnetic susceptibility.

28. The method of claim 7, wherein the treatment slurry comprises iron ore tailings generated by a mineral processing plant.

29. The method of claim 28, wherein the mineral processing plant comprises a plant selected from the group consisting of a natural ore wash plant, a taconite mineral beneficiation plant, and a natural ore heavy media plant.

* * * * *